(12) United States Patent
Kim (10) Patent No.: US 7,167,574 B2
(45) Date of Patent: Jan. 23, 2007

(54) METHOD AND APPARATUS FOR CONTENT-BASED IMAGE COPY DETECTION

(75) Inventor: Changick Kim, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 855 days.

(21) Appl. No.: 10/263,423

(22) Filed: Oct. 1, 2002

(65) Prior Publication Data
US 2003/0174859 A1 Sep. 18, 2003

Related U.S. Application Data

(60) Provisional application No. 60/384,584, filed on May 31, 2002, provisional application No. 60/372,208, filed on Apr. 12, 2002, provisional application No. 60/364,769, filed on Mar. 14, 2002.

(51) Int. Cl.
*G06K 9/00* (2006.01)

(52) U.S. Cl. ................................... 382/100

(58) Field of Classification Search ............ None
See application file for complete search history.

(56) References Cited

U.S. PATENT DOCUMENTS

| | | | |
|---|---|---|---|
| 5,805,746 A | 9/1998 | Miyatake et al. |
| 5,933,499 A | 8/1999 | Enari |
| 5,987,456 A | 11/1999 | Ravela et al. |
| 6,070,171 A | 5/2000 | Snyder et al. |
| 6,141,464 A | 10/2000 | Handley |
| 6,240,423 B1 | 5/2001 | Hirata |
| 6,266,429 B1 | 7/2001 | Lord et al. |
| 6,285,774 B1 | 9/2001 | Schumann et al. |
| 6,285,995 B1 | 9/2001 | Abdel-Mottaleb et al. |
| 6,332,030 B1 | 12/2001 | Manjunath et al. |
| 6,347,144 B1 | 2/2002 | Park |
| 6,373,979 B1 | 4/2002 | Wang |

(Continued)

FOREIGN PATENT DOCUMENTS

EP   0 463 242   1/1992

(Continued)

OTHER PUBLICATIONS

Lau, et al, "Performance analysis of clustering algorithms for information retrieval in image databases", Neural Networks Proceedings, 1998. IEEE World Congress on Computational Intelligence. The 1998 IEEE International Joint Conference on, vol. 2, May 4-9, 1998 pp. 932-937 vol. 2.*

(Continued)

*Primary Examiner*—Bhavesh M Mehta
*Assistant Examiner*—Christopher Lavin (57) ABSTRACT

A method for detecting a copy of a digital image initiates with dividing a suspected copy of a digital image into sub-images. Then, the average intensities associated with each of the sub-images is determined. Next, the average intensities are transformed into a series of coefficients. Then, a rank matrix from the series of coefficients is defined. Next, the rank matrix from the series of coefficients is compared to a rank matrix of a query image to determine if the suspected copy is an actual copy of the digital image. A computer readable media, a computer system and computer code configured to be executed on a computer system are also provided.

24 Claims, 8 Drawing Sheets

U.S. PATENT DOCUMENTS

| | | | |
|---|---|---|---|
| 6,381,367 | B1 | 4/2002 | Ryan |
| 6,389,417 | B1 | 5/2002 | Shin et al. |
| 6,487,311 | B1 * | 11/2002 | Gal et al. ................... 382/225 |
| 6,577,766 | B1 * | 6/2003 | Standridge ................. 382/236 |
| 6,675,174 | B1 | 1/2004 | Bolle et al. |
| 2001/0046332 | A1 | 11/2001 | Chang |
| 2003/0033347 | A1 | 2/2003 | Bolle et al. |
| 2003/0174859 | A1 | 9/2003 | Kim |

FOREIGN PATENT DOCUMENTS

| | | |
|---|---|---|
| EP | 1 195 692 | 4/2002 |
| EP | 1 345 160 | 9/2003 |
| GB | 2 267 598 | 12/1993 |
| JP | 2004-7552 | 1/2004 |
| WO | WO 00/31653 | 6/2000 |
| WO | WO 02/17144 | 2/2002 |

OTHER PUBLICATIONS

V. Kobla, et al., "Indexing and Retrieval of the MPEG Compressed Video", Journal of Electronic Imaging, vol. 7(2), Apr. 1998, pp. 294-307.

N. Dimitrova, et al., "Content-Based Video Retrieval by Example Video Clip", proceedings of the SPIE, vol. 3022, 1997, pp. 59-70.

D. DeMenthlon, et al., "Video Summarization by Curve Simplification", Proceedings of the ACM Multimedia '98, Sep. 12, 1998, pp. 211-218.

"Comparison of Distance Measures for Video Copy Detection", Arun Hampapur and Ruud M. Bolle, in *Proc. IEEE International Conference on Multimedia and Expo (ICME), 2001*.

"Video Copy Detection Using Spatio-Temporal Sequence Matching", C. Kim, *Storage and Retrieval Methods and Applications for Multimedia 2004*, vol. 5307, Jan. 2004, pp. 70-79.

"An Efficient Algorithm for Video Sequence Matching Using the Modified Hausdorff Distance and the Directed Divergence", S. Kim, et al., *IEEE Transactions on Circuits and Systems for Video Technology*, vol. 12, No. 7, Jul. 2002, pp. 592-596.

"Comparison of Sequence Matching Techniques for Video Copy Detection", A. Hampapur, et al., *Storage and Retrieval for Media Databases 2002*, SPIE vol. 4676, Dec. 2001, pp. 194-201.

"Video Sequence Matching", R. Mohan, *Proceedings of the 1998 IEEE International Conference on Acoustics, Speech and Signal Processing*, vol. 6, May 1998, pp. 3697-3700.

"Rime: A Replicated Image Detector for the World-Wide-Web," E. Chang, et al., in *Proc. SPIE Multimedia Storage and Archiving Systems III*, Nov. 1998.

"Ordinal Measure of DCT Coefficients for Image Correspondence and Its Application to Copy Detection", C. Kim, in *Proc. SPIE-5021 Storage and Retrieval for Media Databases 2003*, pp. 199-210, Santa Clara, Jan. 2003.

"Content-Based Image Copy Detection," C. Kim, *Signal Processing: Image Communication*, vol. 18 (3), pp. 169-184, Mar. 2003.

"Feature Based Indexing For Media Tracking," A. Hampapur, in *Proc. IEEE International Conference on Multimedia and Expo (ICME)*, pp. 67-70, 2000.

"A Novel Scheme for Fast and Efficient Video Sequence Matching using Compact Signatures," M. R. Naphade, et al., in *Proc. SPIE conference on Storage and Retrieval for Media Databases*, SPIE vol. 3972, pp. 564-572, Jan. 2000.

"Ordinal Measures for Image Correspondence," D. N. Bhat, et al., *IEEE Trans. Pattern Analysis and Machine Intelligence*, vol. 20, No. 4, Apr. 1998, pp. 415-423.

"Ordinal Measures for Visual Correspondence," D. N. Bhat, et al., Columbia Univ., Computer Science, Tech. Rep. CUCS-009-96, Feb. 1996.

Kim, C., et al., "Spatiotemporal Sequence Matching for Efficient Video Copy Detection", IEEE Transactions on Circuits and Systems for Video Technology, vol. 15, No. 1, Jan. 2005, pp. 127-132.

Hsu, W., et al., "An Integrated Color-Spatial Approach to Content-based Image Retrieval", in Proc. ACM Multimedia, 1995, pp. 305-313.

A.K. Jain, et al., "Query by Video Clip", Multimedia Systems Journal, vol. 7, No. 5, 1999, pp. 369-384.

Swain, M., et al., "Color Indexing", International Journal of Computer Vision, vol. 7, No. 1, 1991, pp. 11-32.

* cited by examiner

METHOD AND APPARATUS FOR CONTENT-BASED IMAGE COPY DETECTION

CROSS REFERENCE TO RELATED APPLICATIONS

This application claims priority from: (1) U.S. Provisional Patent Application No. 60/364,769, filed Mar. 14, 2002, entitled "CONTENT-BASED IMAGE COPY DETECTION," (2) U.S. Provisional Patent Application No. 60/384,584 filed May 31, 2002, entitled "CONTENT-BASED IMAGE COPY DETECTION," and (3) U.S. Provisional Patent Application No. 60/372,208 filed Apr. 12, 2002, entitled "ORDINAL MEASURE OF DCT COEFFICIENTS FOR IMAGE COPY DETECTION." Each of these provisional applications is incorporated by reference herein.

BACKGROUND OF THE INVENTION

1. Field of the Invention

This invention relates generally to digital video technology and more particularly to a method and apparatus for detecting unauthorized copies of a digital image based on the content of the image.

2. Description of the Related Art

The success of the Internet and the widespread availability of cost-effective digital storage devices have made it possible to replicate, transmit, and distribute digital content in an effortless way. Thus, the protection of Intellectual Property Rights (IPR), especially with respect to copyrights of digital images, has become crucial legal issue. In particular, detecting copies of digital media (images, audio and video) is a basic requirement for those investigating possible copyright violations. Two applications of copy detection in use include usage tracking and copyright violation enforcement.

Currently, there are two approaches commonly used to protect a copyright of a digital image: watermarking and content-based copy detection. As is generally known, watermarking embeds information into the image prior to distribution. Thus, all copies of the marked content contain the watermark, which can be extracted, to prove ownership. For content-based copy detection additional information, beyond the image itself, is not required. Generally, the image contains enough unique information that can be used for detecting copies, especially illegally distributed copies. For instance, if an owner of an image suspects that the image is being illegally distributed on the Internet, the owner can raise a query to a copy detection system. It should be appreciated that the content-based copy detection can also be a complementary approach to watermarking. After the copy detector provides a creator or a distributor with a suspect list, the actual owner of the media can use a watermark or other authentication techniques to prove ownership.

Content-based copy detection schemes extract signatures from the original images. The same signature, extracted from the test image, is compared to the original image signature to determine if the test image is a copy of the original image. The key advantage of the content-based copy detection over watermarking is the fact that the signature extraction is not required to be conducted before the image is distributed. However, copies that are not the same as the original, i.e., copies that are slightly modified, may not be detected. For example, a third party may generate various modifications to avoid copy detection or enhance image quality which may cause the content based copy detection system not to detect the copy.

Color histogram-based methods, such as the histogram intersection method, have been used in content-based image retrieval systems. However, they are not suitable for copy detection systems since the color histogram does not preserve information about the spatial distribution of colors. Another method which can consider the pixel locations is the partition based approach. In this method, the image is divided into sub-images. In one such method, the color information of each partition is obtained by a local color histogram. The similarity of two images is measured by comparing their local color histogram, and by considering the similarity of all the sub-images. However, this method comes at a high computational cost and requires a long search time. Additionally, this method will not detect images that have their spatial outlay modified.

Figure 1A:
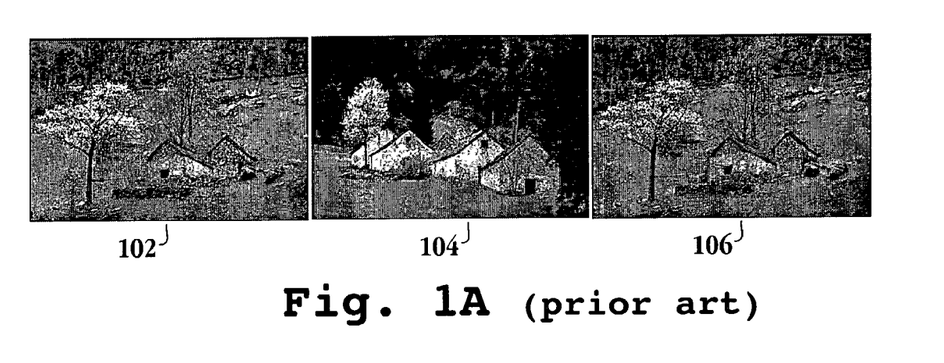
FIG. 1 shows three images illustrating the differences between image copy detector searches and a content-based image retrieval system.

It is worth noting that there is a fundamental difference between content-based image retrieval and image copy detection. An image copy detector searches for all copies of a query image, whereas a content-based image retrieval system searches for similar images, usually in terms of color. For instance, FIG. 1 shows three images illustrating the differences between image copy detector searches and a content-based image retrieval system. Here, image 102 is an original (or query) image, image 104 is similar to image 102 in terms of color, and image 106 is hue changed from image 102. For the case of a color-based image retrieval system, image 104 is considered more relevant to image 102 than image 106, while image 106 is considered more relevant as a copy of image 102 by an image copy detector. Thus, depending on the type of copy detection method used, different results will be obtained where some image copies are not detected by one or all of the methods used. In other words, an acceptable image copy detector should detect copies tolerating some extent of modifications. The modifications include changes in brightness and saturation, shift in hue, and spatial distortions including rotating, flipping, and so on. One proposal to cover the modifications is to include the use of wavelet-based replicated image detection on the web. However, the wavelet-based method would fail to detect copies with flipping or rotating.

As a result, there is a need to solve the problems of the prior art to provide a method and apparatus for robust and efficient content-based image copy detection of a copy of an original digital image where the copy has been modified either in terms of spatial outlay or color.

SUMMARY OF THE INVENTION

Broadly speaking, the present invention fills these needs by providing a method and system for content-based copy detection that can detect copies that have been spatially modified or color modified. It should be appreciated that the present invention can be implemented in numerous ways, including as a method, a system, computer code or a device. Several inventive embodiments of the present invention are described below.

In one embodiment, a method for detecting a copy of a digital image is provided. The method initiates with dividing a suspected copy of a digital image into sub-images. Then, the average intensities associated with pixels from each of the sub-images are determined. Next, the average intensities are transformed into a series of coefficients. Then, a rank matrix from the series of coefficients is defined. Next, the rank matrix from the series of coefficients is compared to a rank matrix of a query image to determine if the suspected copy is an actual copy of the digital image.

In another embodiment, a content-based image copy detection method is provided. The method initiates with selecting image data associated with an image. Then, a signature index is defined from the image data for each image. Next, the signature index from the image data for each image is stored. Then, a signature index for a query image is determined. Next, a match between any one of the stored signature indices from the image data for each image and the signature index for the query image is identified.

In yet another embodiment, a method for finding an unauthorized copy of a digital image is provided. The method initiates with computing a rank matrix for a test image. Then a rank matrix for a query image is computed. Next, a threshold value is determined. The threshold value indicates whether the test image is a copy of the query image. Then, a distance value associated with a distance between the rank matrix for the test image and the rank matrix of the query image is determined. Next, the distance value is compared with the threshold value. If the distance value is less than the threshold value, then the test image is a copy of the query image.

In still yet another embodiment, computer code configured to be executed on a computer system is provided. The computer code includes program instructions for identifying image data. The computer code includes program instructions for defining a feature vector from the identified image data. Program instructions for storing the feature vector in a database are included. Program instructions for determining a match between a feature vector of a query image and the feature vector from the identified image are included. Program instructions for displaying the match between the feature vector of the query image and the feature vector from the identified image are included.

In another embodiment, computer code for determining whether a test image is a copy of a query image is provided. The computer code includes program instructions for calculating a rank matrix associated, with a query image and a rank matrix associated with a test image. Program instructions for determining a threshold value indicative of whether the test image is a copy of the query image are also provided. Program instructions for comparing the rank matrix associated with the query image to the rank matrix associated with the test image are included. The program instructions for comparing include program instructions for determining a distance value between the test image and the query image, and program instructions for examining whether the distance value is less than the threshold value. When the distance value is less than the threshold value, the test image is a copy of the query image.

In yet another embodiment, a computer readable media having program instructions for detecting a copy of a digital image is provided. The computer readable media includes program instructions for dividing a suspected copy of a digital image into sub-images and program instructions for determining average intensities associated with each of the sub-images. Program instructions for transforming the average intensities into a series of coefficients are included. Program instructions for defining a rank matrix from the series of coefficients, and program instructions for comparing the rank matrix from the series of coefficients to a rank matrix of a query image to determine if the suspected copy is an actual copy of the digital image are provided.

In still yet another embodiment, a computer system is provided. The computer system includes a database generation system for assembling image data, the data base generation system includes an image gathering system for identifying the image data and feature extraction code for extracting a signature index for the image data. A database query system for matching the image data with query data is provided. The data base query system includes a database configured to store the signature index for the image data and a feature matching system configured to identify matches between a signature index of the query data and the signature index for the image data.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a system, apparatus and method for detecting unauthorized copies of digital images. It will be apparent, however, to one skilled in the art, that the present invention may be practiced without some or all of these specific details. In other instances, well known process operations have not been described in detail in order not to unnecessarily obscure the present invention. FIG. 1 is described in the "Background of the Invention" section.

The embodiments of the present invention provide a system utilizing an algorithm for efficiently detecting a copy of digital data. As will be explained more fully below, copies that have been modified in terms of color and visible appearance, as well as spatial configuration, can be identified routinely. In one embodiment, suspected copies of a query image found on a distributed network, such as the Internet, are located through a web crawler. The suspected copies are resized to an 8×8 sub-image. A two dimensional discrete cosine transform (DCT) process is applied to the sub-image to generate a rank matrix, also referred to as an ordinal measure, signature index or feature vector. The rank matrix for each suspected copy is stored in a database where each rank matrix may be compared with a rank matrix of the query image to determine whether the suspected copy is an actual copy. In one embodiment, the size of a rank matrix is specified to provide optimum discriminability. The embodiments described herein may utilize clustering methods to provide a more efficient matching process as will be described further below.

A fundamental method for matching images is a correlation-based method, which is based on the sum of pixel differences. Let $I^1$ and $I_2$ represent intensities in two images. There exist N tuples $(I_1^1, I_2^1), \ldots, (I_1^n, I_2^n), \ldots, (I_1^N, I_2^N)$, N denoting the number of pixels in an image. The quantity $$\frac{\sum_{i=1}^{N} |I_1^i - I_2^i|}{N}$$

measures the distance between $(I_1, I_2)$. $I_1^n$ can also be an average intensity of the n-th block, when N denotes the number of blocks. However, these measures are not robust in that a single outlying pixel (or block) can distort them arbitrarily. Furthermore, it is not suitable in the presence of nonlinear intensity variation at corresponding pixels.

Figure 2A:
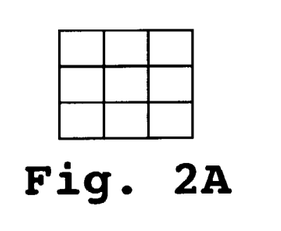
FIGS. 2a–2c are graphical representations of the use of ordinal measures for copy detection.
Figure 2B:
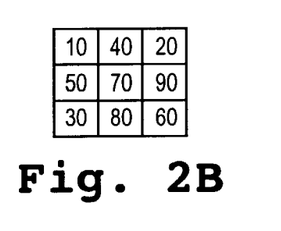
Figure 2C:
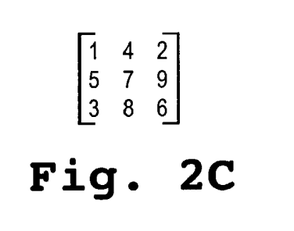

In one embodiment, the use of ordinal measures for stereo image matching provides the required robustness. In one example of using ordinal measures, an image is partitioned into m×n equal-sized blocks, which makes the system independent of input image sizes. The m×n sub-image is calculated by taking an average value of each block FIGS. 2a–2c are graphical representations of the use of ordinal measures for copy detection. FIG. 2a represents the image partitioned into m×n (3×3) equal-sized blocks. An average value of pixel intensity for each block is calculated and illustrated inside each block in FIG. 2b. The array of average values is converted to a rank matrix as shown in FIG. 2c, where the size of the rank matrix is m×n or 1×mn. Thus, if the intensity values in FIG. 2b are uniformly changed in the copied image so its sub-image has values: {{30, 60, 40}, {70, 90, 110}, {50, 100, 80}}, i.e., the intensity value of each of the blocks increase by 20, the rank matrix will not change. That is, the rank matrix of the pixel values is identical to that shown in FIG. 2c and thus perfect matching with the original image can be achieved.

Figure 3:
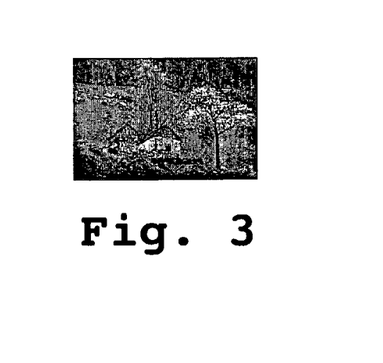
FIG. 3 is a spatially modified image of image 102 of FIG. 1.

However, the use of ordinal measures as described above, will not detect a copy that has been modified in an irregular way, especially if an image's spatial outlay is modified. FIG. 3 is a spatially modified image of image 102 of FIG. 1. The landscape image 102 of FIG. 1 is horizontally flipped as shown in image 108 FIG. 3. The modified image in FIG. 3 will not be detected by using ordinal measures of intensity values as described above. Described below are embodiments in which ordinal measures of AC coefficients, derived from a two dimensional discrete cosine transform, are used to define a one-dimensional rank matrix. The one-dimensional rank matrix is then used as a feature vector that can be compared to a query image to detect copies.

Figure 4:
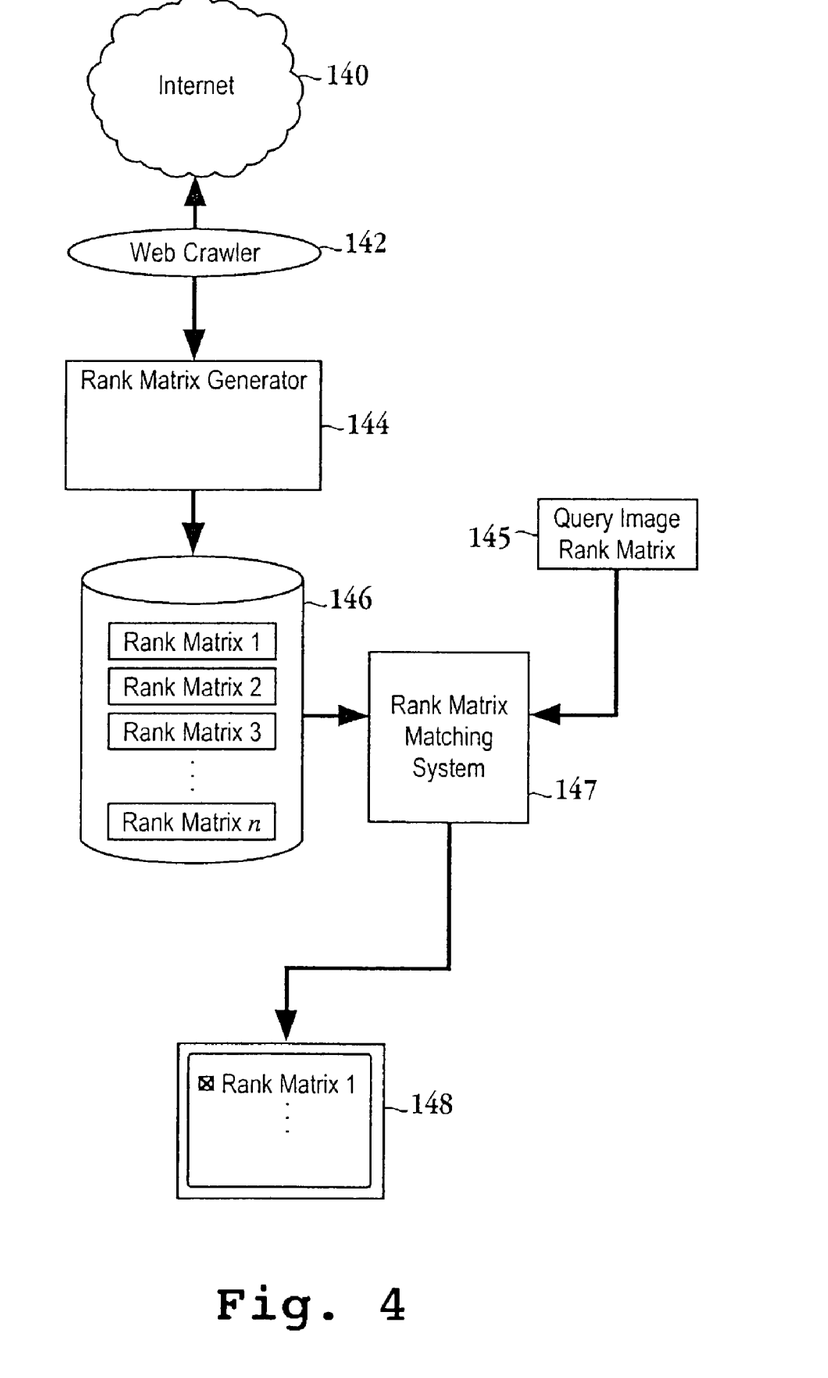
FIG. 4 is a high level schematic diagram of a content-based copy detection system in accordance with one embodiment of the invention.

FIG. 4 is a high level schematic diagram of a content-based copy detection system in accordance with one embodiment of the invention. Web crawler 142 searches a distributed network, such as Internet 140 for possible copies of a query image. It should be appreciated that web crawler 142 can be any suitable web crawler capable of searching for possible image copies. Once web crawler 142 identifies a possible copy of the query image, the possible copy is delivered to rank matrix generator 144. Rank matrix generator 144 manipulates the image data of the possible copy to provide a rank matrix. The rank matrix can be thought of as a digital fingerprint of a possible image copy. In one embodiment, the rank matrices are derived by performing a two dimensional discrete cosine transform (DCT) on an 8×8 representation of the image data. Subsequently, an ordinal measure between two images, where the ordinal measure is of all or a portion of the AC coefficients generated by the two dimensional DCT, is used to determine if an image is a copy of a query image.

Still referring to FIG. 4, the rank matrices for each of the possible copies are stored in database 146. Database 146 is configured so that the database can be searched for matches between the rank matrices 1-n and a query image rank matrix 145. Rank matrix matching system 147 receives query image rank matrix 145 and searches database 146 for a match to the query image rank matrix. In one embodiment, the rank matrices of database 146 are clustered in order to more efficiently find matches with the query image rank matrix. Once a match is found, i.e., a copy of the query image, data indicating a match is output to monitor 148. For example, the one or more rank matrices that are identified as copies of the query image may have pointers to uniform resource locator (URL) addresses. Thus, the copied images can be accessed by clicking on the corresponding outputted rank matrix.

Figure 5:
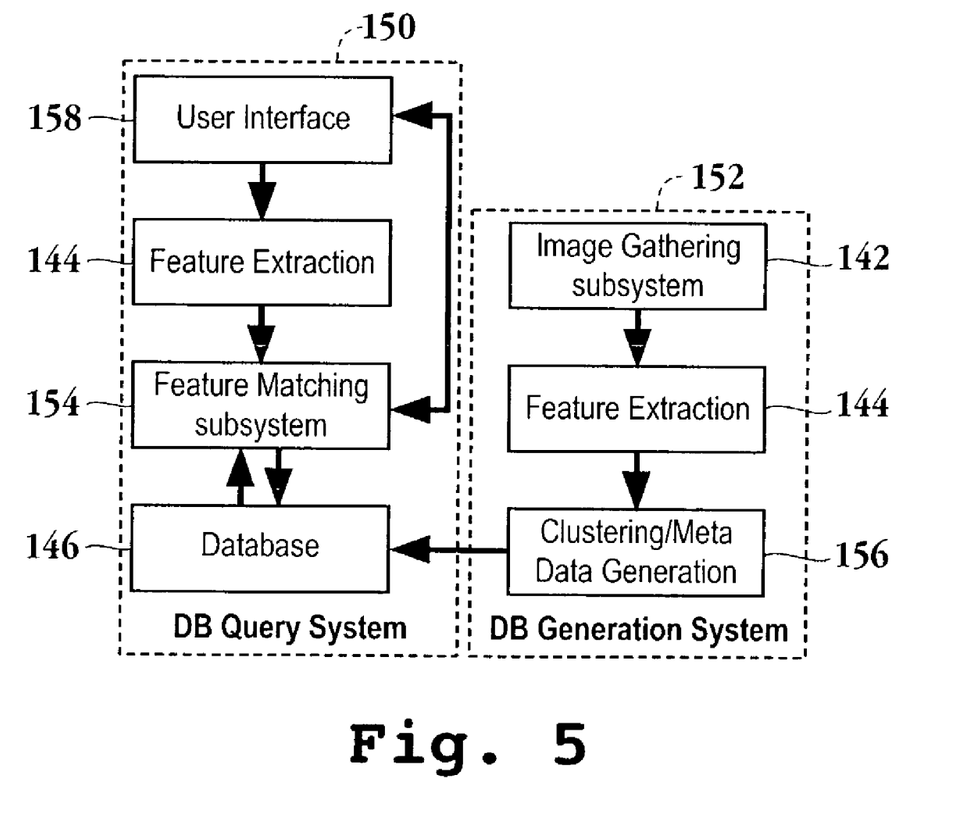
FIG. 5 is a block diagram of the copy detection system configured as two subsystems in communication with each other in accordance with one embodiment of the invention.

FIG. 5 is a block diagram of the copy detection system configured as two subsystems in communication with each other in accordance with one embodiment of the invention. Database query subsystem 156 includes user interface 158, rank matrix generator 144, feature matching subsystem 154 and database 146. Database generation subsystem 152 includes image gathering subsystem 142, rank matrix generator 144 and clustering/meta data generation 156. In one embodiment, the inputs to database generation subsystem 152 are images collected by image gathering subsystem 142, which can be operated manually or by using software, such as a web crawler. The rank matrices of the collected images are extracted from images and then appropriately clustered, as will be explained in more detail below with reference to FIGS. 8–10, to generate indices to be used by database query subsystem 150. Database query subsystem 150 matches a query image whose rank matrix has been extracted to the indexed elements of database 146 to determine if any of the indexed elements are copies of the query image through feature matching subsystem 154. That is, the feature matching subsystem searches the database for matches to the query image in either a clustered environment or a cluster-free environment. Any matches between the indexed elements and the query image are displayed through user interface 158. Of course, the code performing the feature extraction functions and the clustering/meta data generation functions can be hard coded onto a semiconductor chip. One skilled in the art will appreciate that the semiconductor chip can include logic gates configured to provide the functionality discussed above. For example, a hardware description language (HDL) can be employed to synthesize the firmware and the layout of the logic gates for providing the necessary functionality described herein.

Figure 7A:
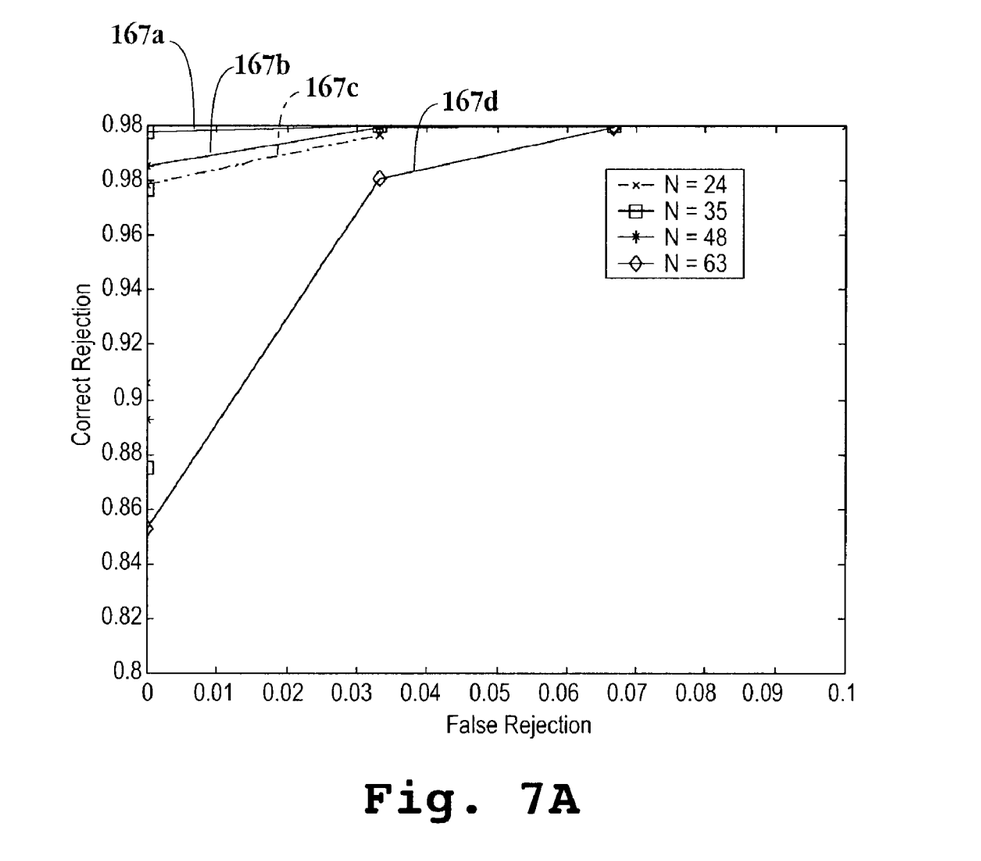
FIG. 7A is a graph of four different rank matrix sizes and their corresponding false and correct rejections rates for determining the rank matrix size having the highest discriminability in accordance with one embodiment of the invention.
Figure 7B:
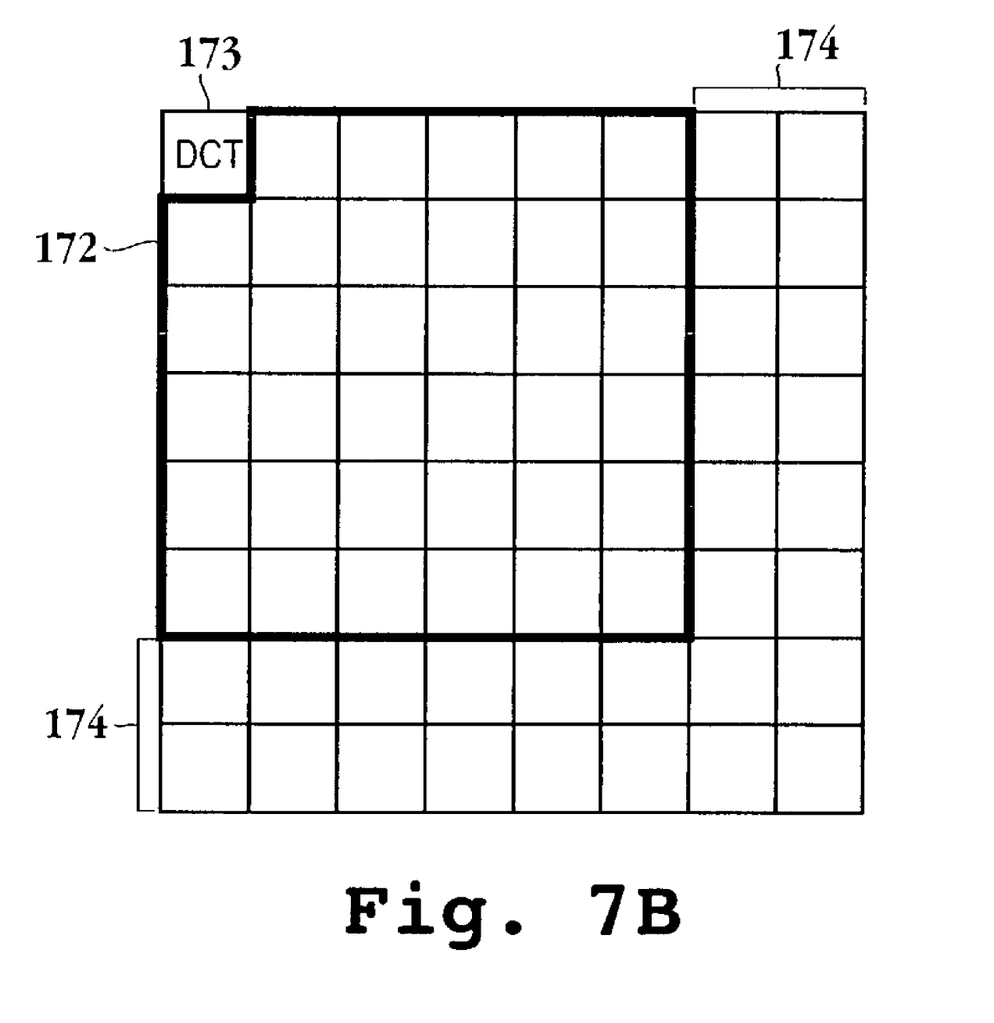
FIG. 7B is a schematic diagram of an 8×8 discrete cosine transform depicting the (6×6)–1 upper left AC coefficients used for ordinal measure in accordance with one embodiment of the invention.

In one embodiment, the ordinal measures of AC coefficients defined as rank matrices, are used for distance measure and as a signature index to represent the corresponding images. The following definitions and mathematical relationships are discussed below to provide insight into the copy detection method which utilizes ordinal measures. An image database is defined as $T=\{C,R\}$, where $C=\{Q,C_1, \ldots, C_m\}$ denotes a set of query (original) image Q and its copies with/without some modifications, and $R=\{R_1, \ldots, R_n\}$ remaining images in a database. The detector (classifier) should have high discriminability between two classes (for example 'class C' for set C and 'class R' for set R, respectively,) while having robustness to various image modifications as discussed in reference to Table 1 and FIGS. 7A and 7B. Let $T_I$ be a test image from a database, then the copy detection is expressed in terms of hypothesis testing terms $$H_0: T_I \in C; H_1: H_0^c$$

where $H_0$ is the null hypothesis and $H_1$ is the alternate hypothesis. In one embodiment, the null hypothesis states that the test image is correlated to the query image, and the alternate states otherwise.

In another embodiment of the invention, ordinal measures of DCT coefficients are used as features to represent images in order to detect as many copies of query image as possible, while minimizing false detections. More particularly, the magnitudes of AC coefficients of 8×8 sub-image are ranked in a descending or ascending order. It should be appreciated that the ranked magnitudes of AC coefficients is simply a permutation of integers and referred to as a rank matrix. More precisely, if $S_N$ denotes the set of all permutations of integers $[1,2, \ldots, N]$, then any rank matrix is an element of this set. To measure correlation between two rank matrices, $r_i$ and $r_j$, derived from image $I_i$ and $I_j$, respectively, it is required to define a distance metric $d(r_i, r_j)$. One skilled in the art will appreciate that the distance between two images is expressed by $L_1$ norm of the Minkowski metric between their rank matrices, $r_i$ and $r_j$:

$$d(r_i, r_j) = \|r_i - r_j\|_1 = \sum_{l=1}^{N} |r_{il} - r_{jl}|, \forall (r_i, r_j) \in S_N,$$

where N is a size of the rank matrix. The $L_1$ norm metric is known more robust to outliers than $L_2$ norm which is equal to $$\sqrt{\sum_{l=1}^{N} (r_{il} - r_{jl})^2}.$$

Furthermore, $L_1$ norm is computationally more efficient. In one embodiment, images in arbitrary formats are converted to YUV format, and only the Y component is used since color doesn't play an important role in copy detection, as opposed to being a crucial feature in the image retrieval system.

Figure 6:
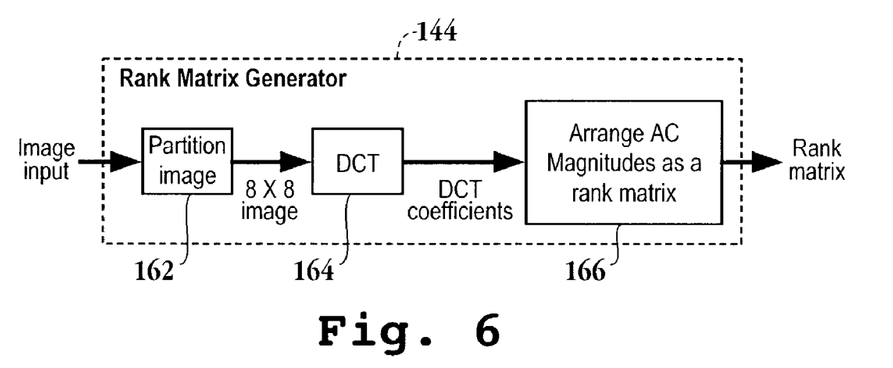
FIG. 6 is a more detailed schematic diagram of the modules of the rank matrix generator in accordance with one embodiment of the invention.

FIG. 6 is a more detailed schematic diagram of the modules of the rank matrix generator in accordance with one embodiment of the invention. An image is input into rank matrix generator 144 and initially enters image partition module 162. Here, the input image is divided into 64 (8×8) equal-sized sub-images (or blocks) in one embodiment. In another embodiment the average intensities, corresponding to the pixels defined by each sub-image, are derived. Then, in discrete cosine transform (DCT) module 164 each of the derived average intensities are transformed into a series of coefficients by performing 8×8 2-dimensional (2-D) DCT. Next, in module 166, the 2-D DCT matrix is then transformed into an ordinal measure of AC coefficients, such as a 1×63 rank matrix, which contains the ranks of sixty three AC magnitudes in either descending or ascending order. For illustrative purposes the rank matrix of the original (query) image Q, is $q=[q_1, q_2, \ldots, q_N]$ and that of a test image T, $t=[t_1, t_2, \ldots, t_N]$, where N=63. Then, the ordinal measure between the query image and the test image D(Q, T) becomes $L_1$ norm between two rank matrices, i.e., $$D(Q, T) = d(q, t) = \sum_{l=1}^{N} |q_l - t_l|.$$

The robustness of the copy detector determines the amount of data inconsistency that can be tolerated by the system before mismatches begin to occur. To show the robustness of the proposed measure to various modifications, a comparison of the measure described above with three other measures is provided for illustrative purposes. It should be appreciated that the measure described above that uses a rank matrix derived from DCT coefficients is defined below as Measure 4. Measures 1–3 are three other measures that are all grid based methods, where the image is divided into 64 (8×8) equal-sized sub-images (blocks) and their average intensities are derived. A brief description of each measure follows:

Measure 1. Measure 1 is a fundamental correlation-based method. Here, $L_1$ norm is calculated between two 8×8 sub-images. The summation of the differences between pixel values of the 8×8 image are used to determine if there is a copy.

Measure 2. Measure 2 is an ordinal measure of sub-images where $L_1$ norm is calculated between two rank matrices generated from 8×8 sub-images. Here, the rank matrix of the pixel values is used determine if there is a copy.

Measure 3. In Measure 3, $L_1$ norm is calculated between two sets of DCT coefficients. Firstly, AC coefficients of 8×8 sub-image are calculated by performing 2-D DCT. Then, $L_1$ norm is calculated between magnitudes of the corresponding AC coefficients from the query image and those from the test image.

Measure 4 $L_1$ norm is calculated using the ordinal measure of AC magnitudes as described in the embodiments contained herein.

For the test of the measures introduced above, 13 modified images from the same image were placed into a database of 40,000 images. That is, the original image and thirteen image modifications were inserted into the database of 40,000 images. Table 1A shows the top 14 ranks from each of the four copy detection tests listed as Measures 1–4 above. The upper case letters A–N denote the image type as defined in Table 1B. It should be appreciated that the image types described in Table 1B are for exemplary purposes only and not meant to be limiting as the embodiments described herein can be used to detect other types of image modifications. Referring back to Table 1A, distance measures of ordinal representation (Measures 2 and 4) were more robust than those of non-ordinal representation (Measure 1 and 3). However, the results from Measure 2 demonstrates that the ordinal measure of pixel values could not tolerate modifications such as rotating and flipping (image type G and H of Table 1B) as would be expected, whereas the ordinal measure of AC magnitude values of DCT coefficients (Measure 4) was able to detect all of thirteen copies and the original. The term FD in Table 1A refers to false detection, i.e., an image that is not a copy was ranked by the corresponding Measure.

TABLE 1A

| RANK | Measure 1 | Measure 2 | Measure 3 | Measure 4 |
|---|---|---|---|---|
| 1 | A | A | A | A |
| 2 | D | D | D | D |
| 3 | F | F | F | F |
| 4 | N | B | N | N |
| 5 | K | J | J | J |
| 6 | L | N | H | B |
| 7 | I | M | G | H |
| 8 | FD | E | E | G |
| 9 | E | K | I | M |
| 10 | FD | L | L | E |
| 11 | FD | I | K | I |
| 12 | FD | C | FD | L |
| 13 | FD | FD | FD | C |
| 14 | FD | FD | FD | K |

TABLE 1B

| Letter Designation | Image Type/Modification |
|---|---|
| A | Original |
| B | Histogram Equalization |
| C | Water Coloring |
| D | Motion Blurring |
| E | Mosaic Tiling |
| F | Gaussian Noising |
| G | 180° Rotating |
| H | Horizontal Flipping |
| I | Hue Change |
| J | Darkening |
| K | Twirling |
| L | Inserting Text |
| M | Contrast Enhancement |
| N | Resizing |

The experimental results provided above, show the proposed measure (Measure 4) is robust to various types of distortions. However, this robustness could turn into a liability when comparing images that are not correlated. This is due to the ordinal measures and using DCT coefficients. Thus, the discriminability, i.e., discriminatory power, of the system also becomes important in that it is concerned with its ability to reject irrelevant images such that false detections do not occur.

In one embodiment of the copy detection scheme described herein, a factor that affects discriminability is the rank matrix size. The rank matrix size determines the amount of AC coefficients that will be used for ordinal measure. The effect of AC coefficients in high frequencies is of interest, since some abrupt changes in pixel values might result in changes in high frequencies. In order to measure the amount of discriminability, an optimum rank matrix size can be determined. The test methodology and results are described below.

Let $x=d(q,t)$ be a distance between query image and a test image in the database. A normalized distance $\hat{x}$ is defined as:

$$\hat{x}=x/M,\ 0\leq\hat{x}\leq 1,$$

where M is the maximum value of $d(r_i, r_j)$, $\forall(r_i, r_j)\in S_N$. M is obtained when the two permutations are the reverse of each other, and N is a rank matrix size. Also, let $w_1$ represent the class C with prior probabilities $P(w_1)$, and let $w_2$ denote the class R so that $P(W_2)=1-P(w_1)$.

It is assumed that the state of nature (class label) and the decision of the system are known. Accordingly such information allows for the determination of the rank matrix size that has the highest discriminability. Considering the two probabilities:

$P(\hat{x} > \hat{x}^* \mid \hat{x} \in w_1)$:

$$\text{False Rejection} = \frac{\text{number of copies whose normalized distances are greater than } \hat{x}^*}{\text{number of total copies}}$$

$P(\hat{x} > \hat{x}^* \mid \hat{x} \in w_2)$:

$$\text{Correct Rejection} = \frac{\text{number of non-copies whose normalized distances are greater than } \hat{x}^*}{\text{number of total non-copies}}$$

where $\hat{x}^*$ is a normalized threshold value for determining whether or not a test image in a database belongs to the class C. It should be appreciated that a false rejection refers to a copy of the image that is rejected as not being a copy while a correct rejection refers to a situation where a non-copy of the image is correctly rejected. If there are a large number of trials, these probabilities can be determined experimentally.

FIG. 7A is a graph of four different rank matrix sizes and their corresponding false and correct rejections rates for determining the rank matrix size having the highest discriminability in accordance with one embodiment of the invention. The rejection rates for four rank matrix sizes (N) are plotted on the two dimensional graph of FIG. 7A with $\hat{x}^*$ being changed from 0 to 1. The graph of FIG. 7A may be referred to as a receiver operating characteristic (ROC) curve. The rank matrix sizes tested are as follows:

N=63: Here, all of the AC coefficients of an 8×8 DCT are used for ordinal measure. Line 167*d* of FIG. 7A illustrates the results.

N=48: Only 48 low frequency AC coefficients are taken and used for ordinal measure, (or 7×7 upper-left coefficients except the DC coefficient). Line 167*b* of FIG. 7A illustrates the results.

N=35: Only 35 low frequency AC coefficients are taken and used for ordinal measure, (or 6×6 upper-left coefficients except the DC coefficient). Line 167*a* of FIG. 7A illustrates the results.

N=24: Only 24 low frequency AC coefficients are taken and used for ordinal measure, (or 5×5 upper-left coefficients except the DC coefficient). Line 167*c* of FIG. 7A illustrates the results.

To discriminate the performances of the proposed measure with respect to the rank matrix size, the size of the set C, was increased to 30 from 14 by adding more various modifications, such as spherizing, radial blurring, brush strokes, and so on. It should be appreciated that these types of image modifications are in addition to the modification types listed in Table 1B. The curve displaying the highest discriminability will pass through coordinates (0,1), where 0 is a relative measure corresponding to false rejections and 1 is a relative measure corresponding to correct rejections. As shown in FIG. 7A by line 167a, the discriminability is highest when the size of rank matrix N is 35. This denotes that appropriate removal of AC coefficients in the high frequencies improves the ordinal measure of AC coefficients. It should be appreciated that the reduction of the rank matrix size to 35 from 63 also helps save memory for indexing. Additionally, any noise in the high frequency AC coefficients is eliminated since those high frequency AC coefficients are typically outside of 6×6 upper-left coefficients.

FIG. 7B is a schematic diagram of an 8×8 discrete cosine transform depicting the 6×6 upper left AC coefficients used for ordinal measure in accordance with one embodiment of the invention. As mentioned with respect to FIG. 7A, a 6×6 block 172 minus DCT coefficient 173 was determined as the optimum number of AC coefficients. Additionally, high frequency AC coefficients in region 174 are more likely to contain noise and are thus eliminated in this embodiment. It should be appreciated that the optimum rank matrix size may change depending on a particular application.

As the size of the image database becomes large, cluster-based detection may be necessary to efficiently search the database. The goal of clustering is to reduce the amount of data by categorizing or grouping similar data items together. Such grouping is pervasive in the way humans process information, and one of the motivations for using clustering algorithms is to provide automated tools to help in constructing categories or taxonomies. It should be appreciated that the methods may also be used to minimize the effects of human factors in the process.

A frequently used clustering method is k-means clustering because it is easy to implement, and is the most efficient in terms of execution time when comparing to its counterparts such as Tabu search, Genetic algorithms, and Simulated annealing. Accordingly, k-means clustering is well suited for large data sets. As is well known, k-means clustering starts with a random initial partition and keeps reassigning the patterns to the nearest clusters and then recomputing centroids until a convergence criterion is met.

The choice of the number of clusters impacts the analysis, i.e., quite different kinds of clusters may emerge when k is changed. The number of clusters, i.e., k, needs to be explicitly specified for the k-means algorithm. Since an optimal number of clusters is not exactly known in advance, a cluster validity analysis is employed to determine the optimum number of clusters. In one embodiment, the optimum number of clusters is the number of clusters that minimize intra-cluster distance while maximizing inter-cluster distance. That is, the rank matrices inside a cluster should be compact while the rank matrices of different clusters are very different in one embodiment. This feature is depicted mathematically below:

$$v(k) = \frac{1}{k}\sum_{i=1}^{k} \max_{1 \le j \le k, i \ne j} \left\{ \frac{\eta_i + \eta_j}{\varepsilon_{ij}} \right\} \text{ where}$$

$$\eta_j = \frac{1}{n_j}\sum_{i=1}^{n_j} d(r_i^{(j)}, \mu_j) \text{ and } \varepsilon_{ij} = d(\mu_i, \mu_j).$$

$\eta_j$ is the intra-cluster distance of cluster j, while $\varepsilon_{ij}$ is the inter-cluster distance between cluster i and j. $r_i^{(j)}$ is the i-th feature vector belonging to j-th cluster, and $n_j$ is the number of feature vectors in the j-th cluster. Thus, the above equation measures the compactness of each cluster and the separation between the clusters. The optimal number of clusters $\hat{k}$ is selected as $$\hat{k} = \min_{2 \le k \le 10} v(k).$$

In other words, the k-means algorithm is tested for k={2,...,10}, and the one which gives the lowest value of v(k) is selected.

The copy detection system described above with reference to FIG. 5 was evaluated in terms of performance. For performance evaluation, rank matrices for five sets of copies of image data were inserted into the database, where each set has 10 modified copies of the original image. Thus, a total of 55 (11×5) rank matrices corresponding to the images were inserted into the database. The modified copies of the originals include alterations discussed with reference to Table 1B and the following types of alterations: craquelure, water paper, mosaic, ripple, ocean ripple, sponge, aspect ratio changed, dark strokes and saturation increased. Again, the embodiments described herein are configured to detect any altered copy of the original and not solely the copies having modifications listed here and in Table 1B. Of course, it is expected that color-based schemes would fail to detect some images where color or contrast are altered, while correlation-based schemes would fail to detect images having been rotated/flipped. The correlation-based schemes are expected to be weak in the presence of nonlinear intensity variation at corresponding pixels. Also, texture-based approaches may have difficulty in dealing with copies where edge locations are altered or new edge points are added, such as modifications commonly referred to craquelure, ocean ripple and mosaic tiles.

To evaluate the performance of the proposed copy detection system and algorithm, the precision and recall rates are defined as follows:

$$\text{Precision}(\hat{x}^*) = \frac{\text{number of copies detected whose } \hat{x} < \hat{x}^*}{\text{number of detections whose } \hat{x} < \hat{x}^*},$$

$$\text{Recall}(\hat{x}^*) = \frac{\text{number of copies detected whose } \hat{x} < \hat{x}^*}{\text{number of total copies}},$$

where $\hat{x}^*$ is a normalized threshold. Each image was raised as a query to detect its eleven copies (10 modifications and 1 original) from the database.

Figure 8:
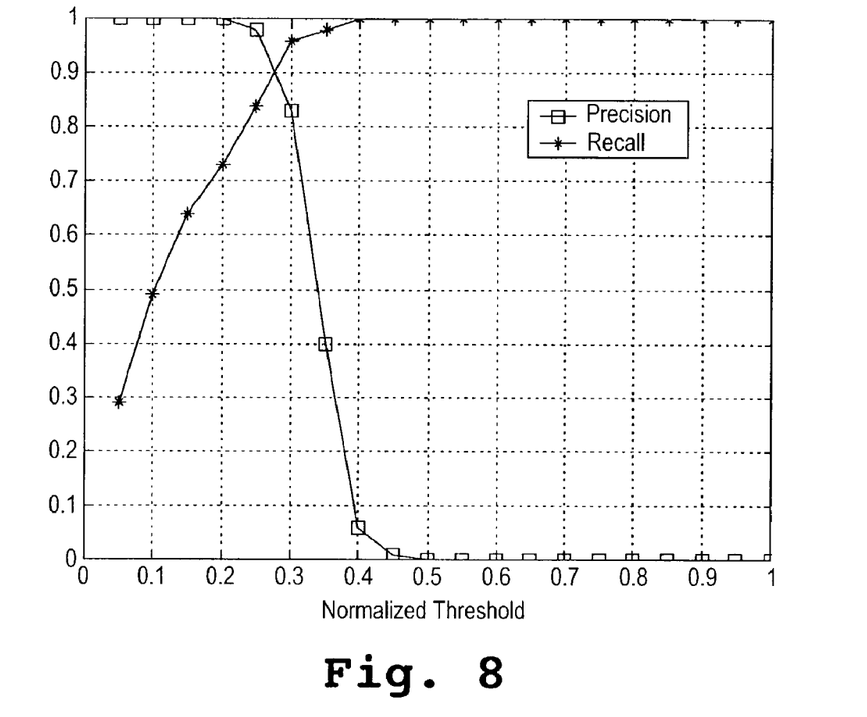
FIG. 8 is a graph of the precision and recall rates versus a normalized threshold in accordance with one embodiment of the invention.

FIG. 8 is a graph of the precision and recall rates versus a normalized threshold in accordance with one embodiment of the invention. As can be seen, desirable results are obtained around a normalized threshold of 0.3, since the precision and the recall are both relatively high. It should be appreciated that having a higher value for recall rate is of importance to minimize the number of missed copies. The threshold value determines whether a test image from the database belongs to the class of copies. In one embodiment, the determination of the threshold value is computed by an algorithm as described below.

In one embodiment, the copy detector, i.e., classifier, employs a threshold value for determining whether a test image from a database belongs to the class C, i.e., the class of copies. An expression for an optimal threshold $\theta_x$, of the copy detection system is illustrated mathematically as:

$$C = \bigcup_i T_i \text{ such that } x = d(q, t_i) < \theta_x,$$

where C is a set of images belonging to the class C and $T_I$ is a test image from the image database. The distance $d(q,t_j)$ between the query (original) image and a test image can be modeled as a random variable x, whose value x has mean $\mu_1$ for images belonging to the class C, and mean $\mu_2$ for remaining images in a database. Assuming the distributions are normal, that is, $p(x|w_i) \sim N(\mu_i, \sigma_I^2)$, where $w_i$ denotes the possible class, with i=1 for class C and i=2 for class R. A reasonable starting point for finding the optimal threshold $\theta_x$ is to use the likelihood ratio test as follows:

Decide $w_1$ if $P(w_1|x) > P(w_2|x)$; otherwise decide $w_2$, where $P(w_1|x)$ and $P(w_2|x)$ represent the a posteriori conditional probabilities that correspond to $H_0$ and $H_1$, respectively. If Bayes theorem is applied on both sides of the expression and the terms are rearranged as shown below $$\frac{p(x|w_1)}{p(x|w_2)} \overset{H_0}{\underset{H_1}{\gtrless}} \frac{P(w_2)}{P(w_1)}, \quad (1)$$

the left-hand ratio is known as the likelihood ratio, and the entire equation is often referred to as the likelihood ratio test. Since the test is based on choosing the image class with maximum a posteriori probability, the decision criterion is called the maximum a posteriori (MAP) criterion. It should be appreciated that the MAP criterion can also be referred to as the minimum error criterion, since on the average, this criterion yields the minimum number of incorrect decisions. Let K denote the ratio of priors $P(w_2)/P(w_1)$, then equation (1) can be written as follows:

$$\frac{p(x|w_1)}{p(x|w_2)} \overset{H_0}{\underset{H_1}{\gtrless}} K. \quad (2)$$

Modeling the class-conditional probability density functions by Gaussian distributions yields:

$$p(x|w_1) = \frac{1}{\sqrt{2\pi}\,\sigma_1} \exp\left[-\frac{1}{2}\left(\frac{x-\mu_1}{\sigma_1}\right)^2\right], \quad (3)$$

$$p(x|w_2) = \frac{1}{\sqrt{2\pi}\,\sigma_2} \exp\left[-\frac{1}{2}\left(\frac{x-\mu_2}{\sigma_2}\right)^2\right]. \quad (4)$$

wherein the distributions approximately model the real data. By substituting equations (3) and (4) into (2), provides:

$$\exp\left[-\frac{1}{2}\left(\frac{x-\mu_1}{\sigma_1}\right)^2 + \frac{1}{2}\left(\frac{x-\mu_2}{\sigma_2}\right)^2\right] \overset{H_0}{\underset{H_1}{\gtrless}} K\frac{\sigma_1}{\sigma_2}. \quad (5)$$

Then, taking the log of each side, $$-\frac{1}{2}\left(\frac{x-\mu_1}{\sigma_1}\right)^2 + \frac{1}{2}\left(\frac{x-\mu_2}{\sigma_2}\right)^2 \overset{H_0}{\underset{H_1}{\gtrless}} \ln\left(K\frac{\sigma_1}{\sigma_2}\right). \quad (6)$$

Assuming that both classes have the same variance, allows for statistically constraining the class C so that copies that are too much distorted are regarded as having lost the identity of the original image. Since $\sigma = \sigma_1 = \sigma_2$, equation (6) is reduced to $$2x(\mu_1 - \mu_2) + \mu_2^2 - \mu_1^2 \overset{H_0}{\underset{H_1}{\gtrless}} 2\sigma^2 \ln(K). \quad (7)$$

Finally, the solution for calculating an optimal threshold, $\theta_x$, for x by rearranging equation (7) to:

$$x \overset{H_0}{\underset{H_1}{\lessgtr}} \frac{\mu_1 + \mu_2}{2} - \frac{\sigma^2 \ln(K)}{\mu_2 - \mu_1} = \theta_x. \quad (8)$$

In analyzing equation (11) it is observed when K=1, or the prior probabilities for both classes are the same, the optimal threshold becomes the average value of two mean values, or $(\mu_1+\mu_2)/2$. As K increases, the optimal threshold is reduced since $$\frac{\sigma^2 \ln(K)}{\mu_2 - \mu_1} > 0.$$

In practice, K is likely to have a much larger value. To calculate the optimal threshold by equation (11), the same test materials discussed above with reference to TABLE 1, where 30 copies and an original were placed into a database of 40,000 images. Then, ($\mu_1$, $\mu_2$, and $\sigma_2^2$ were calculated whose normalized values are 0.1464, 0.5842, and 0.0043, respectively. In this embodiment, the optimal threshold determined through the application of equation (8) is 0.30 with K=40,000/30. Note that the threshold value is 0.37 when K=1. Here, the optimal threshold is placed lower than the simple average of two means from both classes as K increases. It should be appreciated that a test image from a database is less probable to belong to the class of copies as K becomes large.

While the above mentioned performance tests were conducted as cluster-free copy detection, the cluster-based detection explained above with respect to k means clustering, may be incorporated with the performance tests. As mentioned above, the feature vectors, i.e. rank matrices, in the database are clustered by a k-means algorithm and a cluster validity analysis may be performed to determine the optimal number of clusters.

Figure 9:
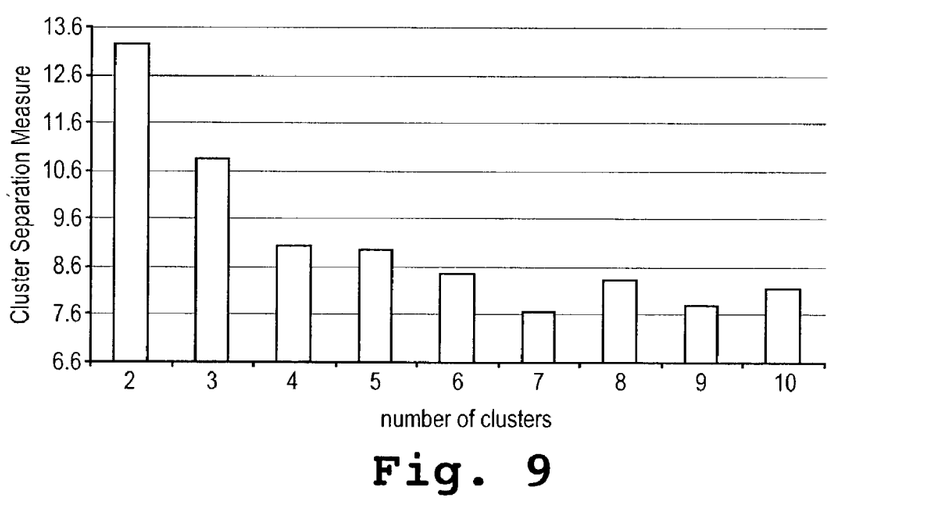
FIG. 9 is a graph illustrating the results of a cluster validity analysis for determining an optimal number of clusters in accordance with one embodiment of the invention.

FIG. 9 is a graph illustrating the results of a cluster validity analysis for determining an optimal number of clusters in accordance with one embodiment of the invention. It indicates that cluster validity measure v(k) is at a minimum when k=7. Thus, the number of clusters in the system was set to be 7 in one embodiment. Here, the seven cluster centroids are first compared with the feature vector of a query image. In one embodiment, only feature vectors, such as rank matrices, in the cluster whose centroid belongs to N closest centroids to the feature vector of the query image are chosen for more efficient copy detection. For the copy detection system corresponding to FIG. 9, the optimum number of clusters was determined as four as discussed with reference to FIG. 10. Thus, four out of the seven clusters are identified as being aligned with the rank matrix of the query image and are searched for copies. It will be apparent to one skilled in the art that the number of clusters indicated by the cluster validation analysis can change to be greater or less than 7 depending on the application. Also, the number of clusters identified to be searched can include a portion of the total clusters or all of the clusters. As discussed above, the copy detection may even be operated in a cluster-free environment.

Figure 10:
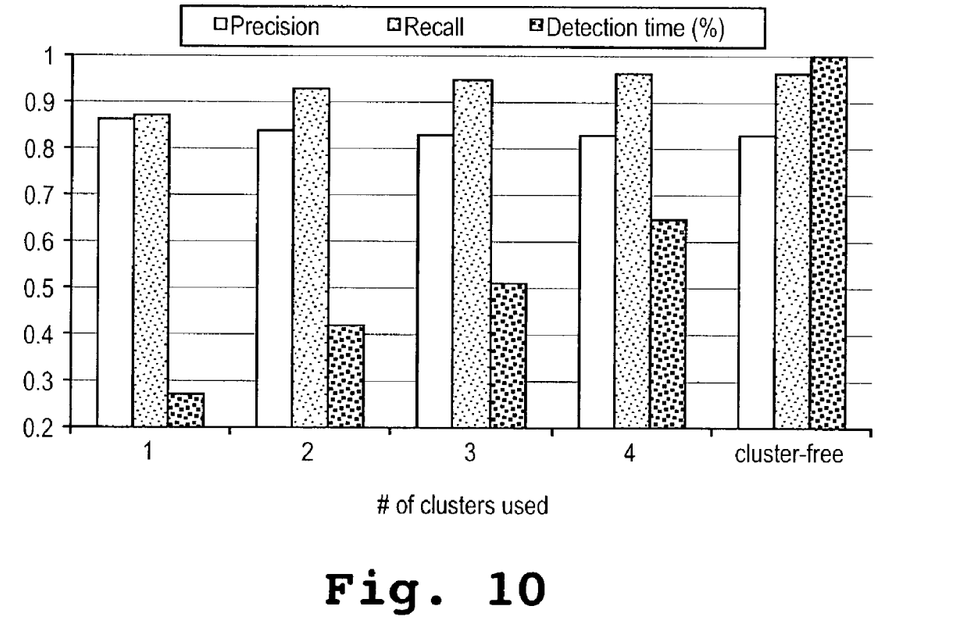
FIG. 10 is a graph comparing the precision and recall rates at the optimal threshold using cluster-based detection in accordance with one embodiment of the invention.

FIG. 10 is a graph comparing the precision and recall rates at the optimal threshold using cluster-based detection in accordance with one embodiment of the invention. The resultant precision and recall rates at the optimal threshold are plotted for a cluster-free case and when 1, 2, 3, or 4 clusters of the 7 clusters, as discussed above, are considered. As shown in FIG. 10, the precision rate was the highest while the recall rate was the lowest when only the closest cluster to the query image was used for copy detection. As the number of the closest clusters used increases, i.e., N increases, the precision rate decreases slightly, while the recall rate increases.

The detailed values of the cluster-based copy detection results, where the number of the closest clusters used was 4, are summarized in Table 2. In this case, the results were the same as those from cluster-free detection, whereas the processing time for detection was 65% less as compared to that of cluster-free detection as shown in FIG. 10. The processing time for cluster-free detection was about 1.8 seconds on Pentium III at 933 MHz, which includes feature vector extraction of the query image and distance matching with 40,000 feature vectors in the database. As shown in Table 2, out of 55 inserted copies to the database of 40,000 images, 53 copies were detected at the optimal threshold, whereas only two copies were missed for the query of image C. The missed copies were copies modified by dark strokes and a copy modified by water color. For the query of image B, 12 false detections were included, while copies of the image query were all ranked in the top 11 images detected. Accordingly, an adaptive thresholding scheme may be useful here depending on the characteristics of the query image in one embodiment. It should be appreciated that the normalized optimal threshold $\hat{\theta}_x$ was assigned 0.3 as discussed with reference to FIG. 8. In addition, the precision and recall values of FIG. 10 are the same for the cluster-free detection and the 4 cluster detection. Of course, as mentioned above, the time for the 4 cluster detection is significantly less than the cluster-free detection.

| Query Image | X = # of copies < $\hat{\theta}_x$ | Y = # of detections < $\hat{\theta}_x$ | Precision ($\hat{\theta}_x$) = X/Y | Recall ($\hat{\theta}_x$) = X/11 | # of copies in Top 11 ranks | # of copies missed at $\hat{\theta}_x$ |
|---|---|---|---|---|---|---|
| A | 11 | 12 | 0.92 | 1 | 11 | 0 |
| B | 11 | 23 | 0.48 | 1 | 11 | 0 |
| C | 9 | 9 | 1 | 0.82 | 10 | 2 |
| D | 11 | 11 | 1 | 1 | 11 | 0 |
| E | 11 | 15 | 0.73 | 1 | 10 | 0 |
| AVERAGE | | | 0.83 | 0.96 | 10.6 | 0.4 |

The data of Table 2 illustrates the effectiveness of the copy detection method described above. With respect to query images A, B, D, and E all 11 images (10 modified copies and 1 original) were detected. For query image C, 9 of the 11 images were detected. Furthermore, the 11 images were consistently ranked in the top 11 images found when more than 11 images were detected. It should be appreciated that the images were stored as rank matrices in the database and the database was searched according to a rank matrix of the query image as described above. Of course, the data in the database can be clustered or cluster-free.

Figure 11:
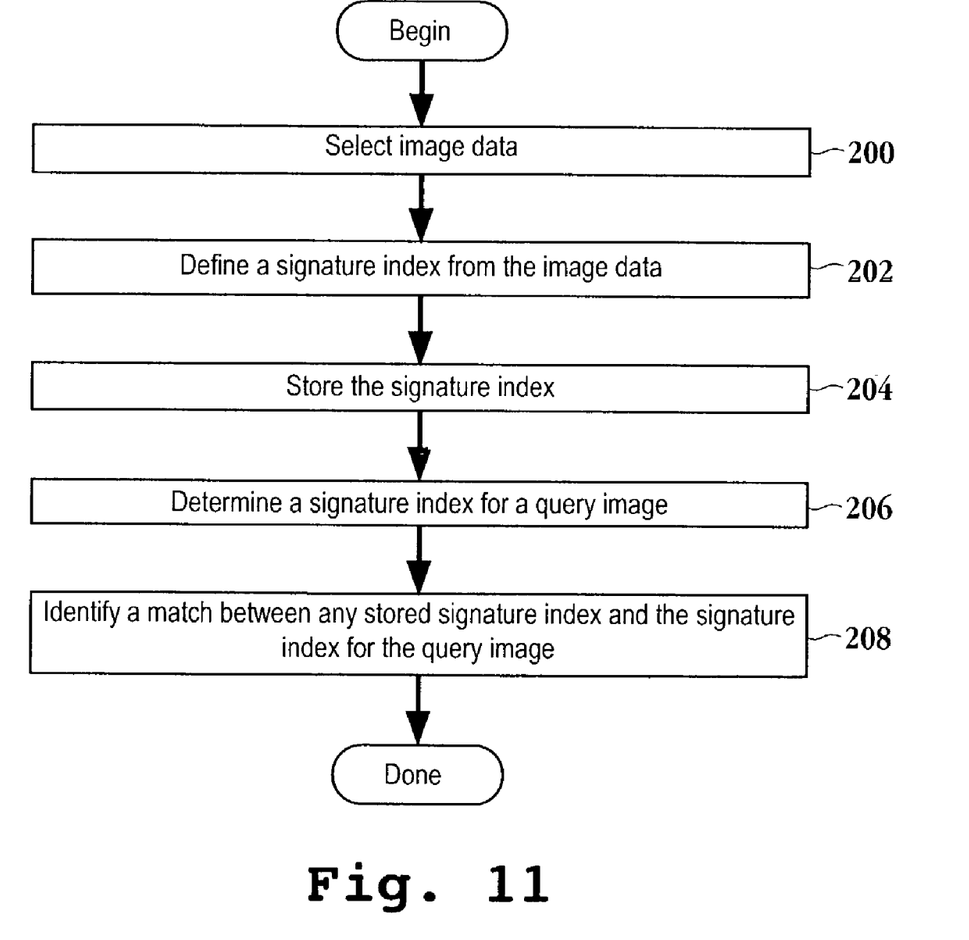
FIG. 11 is a flowchart diagram of the method operations for detecting a copy of a digital image in accordance with one embodiment of the invention.

FIG. 11 is a flowchart diagram of the method operations for detecting a copy of a digital image in accordance with one embodiment of the invention. The flowchart initiates with operation 200 where an image is selected. The image selected here is an image on a distributed network, such as the Internet, and is found through the assistance of search software, such as a web crawler, in one embodiment of the invention. The method then advances to operation 202, where a signature index from the image is defined. The signature index, also referred to as a feature vector, includes a one-dimensional rank matrix as discussed above. In one embodiment, the signature index, i.e., the rank matrix is derived by subdividing the selected image into 64 equal sized sub-images or blocks. The 64 equal sized sub-images are arranged as an 8×8 grid. The average intensities calculated from pixel values associated with each of the sub-images are averaged. The average intensities are transformed into a series of coefficients through a two dimensional DCT operation. The series of coefficients from the DCT is then transformed into a rank matrix. As mentioned above with reference to FIGS. 7A and 7B, the rank matrix may include all 63 AC coefficients or some portion thereof.

The method of FIG. 11 then proceeds to operation 204 where the signature index is stored after the signature index has been defined. For example, the signature index is stored in a database, in one embodiment. As mentioned above with reference to FIGS. 8–10, the signature indices are clustered for more efficient detection of copies of an image in a database. In one embodiment, the data is clustered in the database by a clustering method, such as k-means clustering. The method then moves to operation 206 where a signature index for a query image is determined. It should be appreciated that the query image is the original image for which copies are being detected. In one embodiment, the signature index for the query image is determined as discussed above with reference to method operation 202, where the signature index for the image data is defined. The method then advances to operation 208 where a match between any stored signature index and the signature index for the query image is identified. In one embodiment, a rank matrix matching system is used to identify matches between rank matrices. In another embodiment, the time to detect matches is optimized by determining an optimum number of clusters of signature indices by a cluster validity analysis.

In summary, the above described invention detects unauthorized copies of a digital image. In one embodiment, the copy detector has an image database, where images are collected from million's of web pages. Alternatively, the system can maintain a database of signature indices, i.e., feature vectors, and URLs of the images. It should be appreciated that the database of signatures is desirable for avoiding copyright issues as well as for saving memory space, since the stored images are deleted after their feature vectors are extracted. An automated image searching tool, which crawls the web periodically, profiles newly discovered images, and then indexes them based on their features.

The specific examples described herein use ordinal measure of 35 DCT coefficients of 8×8 sub-image to avoid high frequency noise, although any number of DCT coefficients may be used. Results are robust to various modifications including flipping and rotating as well as color modifications. Additionally, the embodiments have a high discriminatory power to minimize the occurrence of false detections. For indexing the rank matrices, 6 bits×35/image, i.e., about 27 bytes/image are necessary for each rank matrix, where the rank matrix size equals 35. One skilled in the art will appreciate that depending on the particular application, more efficient clustering and indexing may be considered to effectively deal with a database containing millions of images. It should be appreciated that the specific examples provided herein, such as the optimum number of DCT coefficients and the optimum number of clusters of the signature indices in the database are presented in relation to specific examples. Thus, the optimum numbers may differ depending on the type of signature index, the size of the database, the desired precision and recall, the optimal threshold, etc. However, the methods discussed above to arrive at the optimum levels may be applied to any application for content-based image copy detection.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for detecting a copy of a digital image, comprising:
   dividing a suspected copy of a digital image into sub-images;
   determining an average intensity for each particular sub-image by calculating an average of all the pixels in each particular sub image;
   transforming the average intensities into a series of coefficients;
   defining a rank matrix of the digital image from the series of coefficients, wherein the rank matrix is limited to the low frequency coefficients of the series of coefficients except for the DC coefficient of the series of coefficients; and
   comparing the rank matrix of the digital image to a rank matrix of a query image to determine if the query image is an actual copy of the digital image.

2. The method of claim 1, wherein the method operation of transforming the average intensities into a series of coefficients includes,
   generating a two dimensional series of coefficients by performing a two dimensional discrete cosine transform (DCT).

3. The method of claim 1, wherein defining a rank matrix of the digital image includes,
   arranging the series of coefficients into a one dimensional rank matrix.

4. The method of claim 3, wherein the one dimensional rank matrix places magnitudes of the series of coefficients in descending order.

5. The method of claim 1, wherein comparing the rank matrix includes calculating the distance between the rank matrix of the query image and the rank matrix of the digital image.

6. A computer-readable medium encoded with computer code configured to be executed on a computer system comprising program instructions for executing the method of claim 1.

7. A content-based image copy detection method, comprising:
- selecting image data associated with an image;
- defining a signature index from the image data;
- storing the signature index from the image data;
- determining a signature index for a query image, wherein a size of the signature index from the image data and a size of the signature index for a query image are optimized to minimize false detections, wherein the signature index is limited to low frequency coefficients of a series of coefficients except for a DC coefficient of the series of coefficients; and
- identifying a match between the stored signature index from the image data and the signature index for the query image.

8. The method of claim 7, wherein both the signature index from the image data and the signature index for a query image are defined by a signature index having a number of coefficients selected from the group consisting of 24, 35, 48, and 63.

9. The method of claim 7, wherein the signature index from the image data is stored in a database.

10. The method of claim 7, wherein the method operation of selecting image data associated with an image includes,
- searching a distributed network for the image data; and
- defining a cluster from a plurality of signature indices.

11. The method of claim 10, wherein a k-means algorithm is used to define the cluster.

12. The method of claim 10, wherein a number of clusters is determined by a cluster validity analysis.

13. The method of claim 10, wherein the cluster includes a cluster centroid.

14. The method of claim 13, further including:
- comparing the signature index for the query image with the cluster centroid to determine whether the cluster is searched.

15. The method of claim 10, further comprising determining if a particular cluster has been searched for matches to the signature index of the query image.

16. A computer-readable medium encoded with computer code configured to be executed on a computer system comprising program instructions for executing the method of claim 7.

17. A method for finding an unauthorized copy of a digital image, comprising:
- computing a rank matrix for a test image;
- computing a rank matrix for a query image;
- limiting the rank matrices to low frequency coefficients of a series of coefficients except for a DC coefficient of the series of coefficients;
- determining a threshold value, the threshold value indicating whether the test image is a copy of the query image;
- determining a distance value associated with a distance between the rank matrix for the test image and the rank matrix of the query image; and
- comparing the distance value with the threshold value, wherein if the distance value is less than the threshold value, then the test image is a copy of the query image.

18. The method of claim 17, wherein the method operation of determining a threshold value includes,
- applying a maximum a posteriori (MAP) criterion to calculate the threshold value.

19. The method of claim 17, wherein the threshold value is inversely proportional to a ratio of prior probabilities.

20. The method of claim 17, further including:
- calculating the rank matrix for the test image and the rank matrix for the query image through a two dimensional discrete cosine transform.

21. The method of claim 17, wherein the threshold value is associated with an optimal precision value and an optimal recall value.

22. A computer-readable medium encoded with computer code configured to be executed on a computer system comprising program instructions for executing the method of claim 17.

23. The method of claim 17 further comprising gathering a plurality of query images.

24. The method of claim 23, wherein the gathering of the plurality of query images is performed by a web crawler.

* * * * *